United States Patent [19]

Thompson

[11] 4,299,066
[45] Nov. 10, 1981

[54] DOME STRUCTURE HAVING AT LEAST ONE ENVIRONMENTALLY ISOLATABLE COMPARTMENT

[76] Inventor: Virley P. Thompson, 6700 Franklin Ave., Std. #3, Los Angeles, Calif. 90028

[21] Appl. No.: 124,521

[22] Filed: Feb. 25, 1980

[51] Int. Cl.³ .................... E04B 1/34; E04H 9/00; B64G 1/00; B63C 11/00
[52] U.S. Cl. ..................... 52/81; 52/236.2; 114/314; 244/159
[58] Field of Search .................... 244/159, 162; 52/80, 52/81, 236.2; 114/257, 314, 312; 405/188, 185, 189

[56] References Cited

U.S. PATENT DOCUMENTS

| | | | |
|---|---|---|---|
| 872,888 | 12/1907 | Becchi | 405/190 |
| 915,026 | 3/1909 | Gustavino | 52/236.2 |
| 1,008,301 | 11/1911 | Baker | 405/189 |
| 1,299,121 | 4/1919 | Burton | 405/188 |

FOREIGN PATENT DOCUMENTS 660369 4/1963 Canada .................... 114/257

OTHER PUBLICATIONS

Civil Engineering, Oct. 1959, pp. 46, 47, 48, 49, 52-80.

Primary Examiner—John E. Murtagh
Attorney, Agent, or Firm—Robert J. Schaap

[57] ABSTRACT

A dome structure having a plurality of isolatable and preferably environmentally isolatable and inhabitable compartments. These inhabitable compartments are preferably capable of generating an environmental condition capable of supporting animal life and preferably human life. The dome structure comprises a first upper dome section and a first lower dome section which form a first environmentally isolated dome chamber therebetween. The apparatus includes a second upper dome section having a peripheral size smaller than the first upper dome section. A second lower dome section has a peripheral size smaller than the first lower dome section and is capable of being attached to the second upper dome section to form a second environmentally isolated dome chamber. This second isolated dome chamber is surrounded by and environmentally isolated from the aforesaid peripheral portions of the first and second upper dome sections and peripheral portions of the first and second lower dome sections to thereby ensure the isolation in the first and second dome chambers. In a particular preferred embodiment, each of the first and second dome chambers are of a size to be occupied by human beings. The structure includes means to generate its own source of power such as electrical power.

18 Claims, 4 Drawing Figures

DOME STRUCTURE HAVING AT LEAST ONE ENVIRONMENTALLY ISOLATABLE COMPARTMENT

BACKGROUND OF THE INVENTION

1. Field of the Invention

This invention relates in general to new and useful improvements in environmentally occupiable dome structures, and more particularly, dome structures having at least one and preferably a plurality of isolatable and environmentally inhabitable compartments in which it is adapted to be used in external environments which are not necessarily compatible for human life, but where the one or more compartments in said dome structure are capable of sustaining human life.

2. Brief Description of the Prior Art

In recent years, there has been an increased interest in dome structures which are environmentally isolated, primarily for purposes of research and exploration. For example, one such dome structure exists in the form of a bathesphere used for deep sea exploration.

Further, in view of constraints on available surface area on the earth's surface and in the constraints on resources which are available to sustain human life, there has also been increased interest in finding other life supporting environmentally isolated structures. Heretofore, there has been no effective structure which is capable of being formed into a plurality of chambers and which is isolated from existing environments and is also capable of sustaining human life.

OBJECTS OF THE INVENTION

It is, therefore, a primary object of the present invention to provide a dome structure which is capable of being environmentally isolated from an existing surrounding environment, which is divided into a plurality of compartments which are capable of sustaining human life.

It is another object of the present invention to provide a dome structure of the type stated which is comprised of a plurality of spaced apart dome shells so as to provide a large number of isolated compartments.

It is a further object of the present invention to provide a dome structure of the type stated which provides means for generating life sustaining power including for example, electrical power and the like.

It is an additional object of the present invention to provide a dome structure of the type stated which is highly effective for use as a space station, located beyond the gravitational effect of the earth and for an under-sea life sustaining environment.

It is yet another object of the present invention to provide a dome structure of the type stated which is highly effective in its operation and highly reliable in its construction.

With the above and other objects in view, my invention resides in the novel features of form, construction, arrangement and combination of parts presently described and pointed out in the claims.

BRIEF SUMMARY OF THE DISCLOSURE

A dome structure having at least one inhabitable and environmentally isolatable compartment which is at least isolated with respect to an external environment. In one embodiment of the invention, the dome structure is comprised of a first dome and preferably a spherical dome. A second dome, and preferably a spherical dome has a size smaller than the first dome and is located within the first dome. In this way, a first dome section or chamber is formed between the first and second domes. In addition, the second dome may be subdivided by one or more horizontally disposed dividers to form a plurality of individual chambers within the second dome. In like manner, a plurality of vertically disposed dividers could be located in the second dome in place of or in addition to the horizontally disposed dividers in order to yet form additional individual chambers within the second dome.

The same possibility holds true with respect to the first dome in that the chamber formed between the first and second domes could also be divided into a plurality of individual chambers. Thus, for example, horizontal dividers and/or vertical dividers could be located in the space between the first and second domes thereby providing a plurality of individual chambers therein.

In one of the preferred embodiments of the invention, the first dome is comprised of a first upper dome section and a first lower dome section. In like manner, the second dome is constructed by a second upper dome section and a second lower dome section. Each of these dome sections may be provided with peripherally extending portions as for example, flange sections on a periphery thereof which are engagable with each other. In this way, each of the individual dome sections of the first and second domes may be secured together.

It is also possible to employ additional domes which surround the first dome or additional domes located within the second dome. For example, a third dome could be located within and spaced apart from the second dome. This third dome would then have a size diametrically smaller than the second dome. In like manner, the third dome could have a size which is larger than the first dome and extend therearound. In addition, the third dome could have one or more horizontal and/or vertical dividers located therein in order to provide additional compartments.

In the dome structure of the present invention, each of the compartments formed by the various domes in the structure are isolated from an external environment. Thus, for example, the dome structure could be located in outer space such that the interior is environmentally isolated from the outer space environment. In like manner, the dome structure could be designed for under water use, e.g., deep sea use such that the interior is isolated environmentally from the ocean itself.

The dome structure of the present invention may include one or more chambers which function as ballast chambers and include means for introducing water into and pumping water from such ballast chamber or chambers. In this way, the dome structure is capable of being submerged and resurfaced much in the same manner as a conventional submarine.

In other embodiments of the invention, the dome structure may include solar cells and like devices for creating energy as for example, electrical energy, heat energy and the like from solar radiation. The dome structure itself may also be highly effective for land surface use in the earth environment merely as a uniquely designed structure having a plurality of chambers or rooms therein which could function as a visitor center, an amphitheater and the like.

This invention possesses many other advantages and has other purposes which may be made more clearly apparent from a consideration of the forms in which it may be embodied. These forms are shown in the drawings forming and accompanying part of the present specification. They will now be described in detail for the purposes of illustrating the general principles of the invention, but it is to be understood that such detailed descriptions are not to be taken in a limiting sense.

BRIEF DESCRIPTION OF THE DRAWINGS

Figure 1:
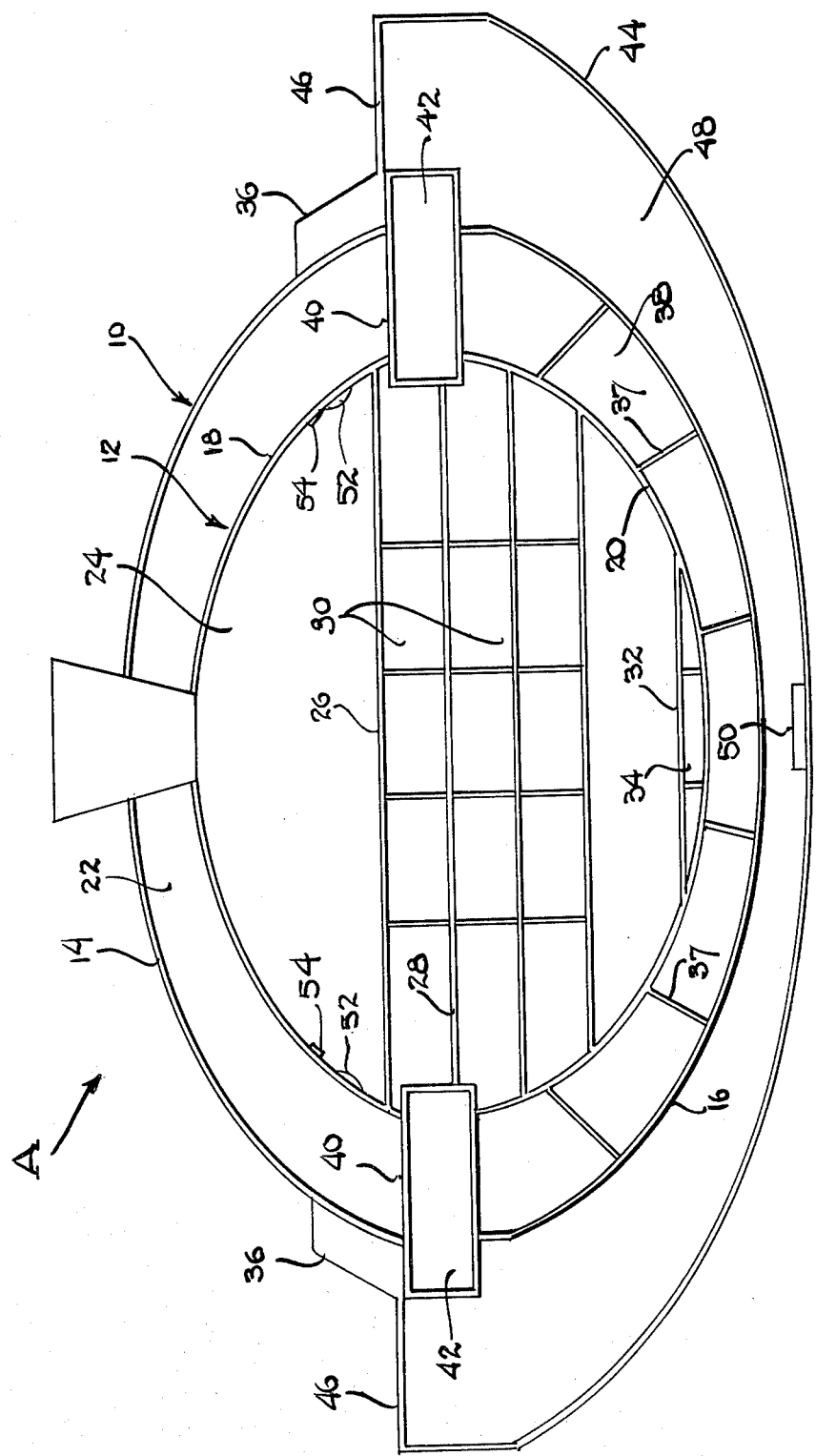
Figure 2:
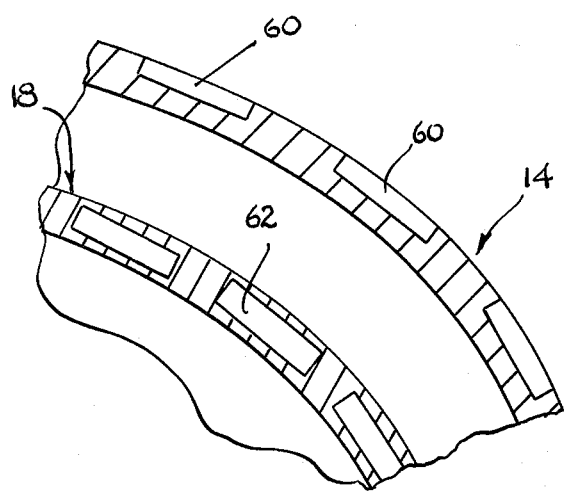
Figure 3:
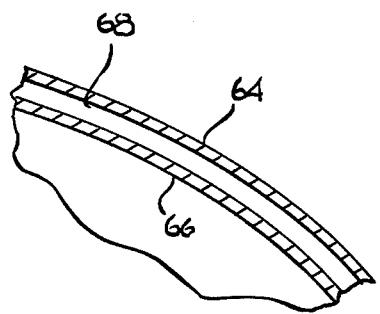
Figure 4:
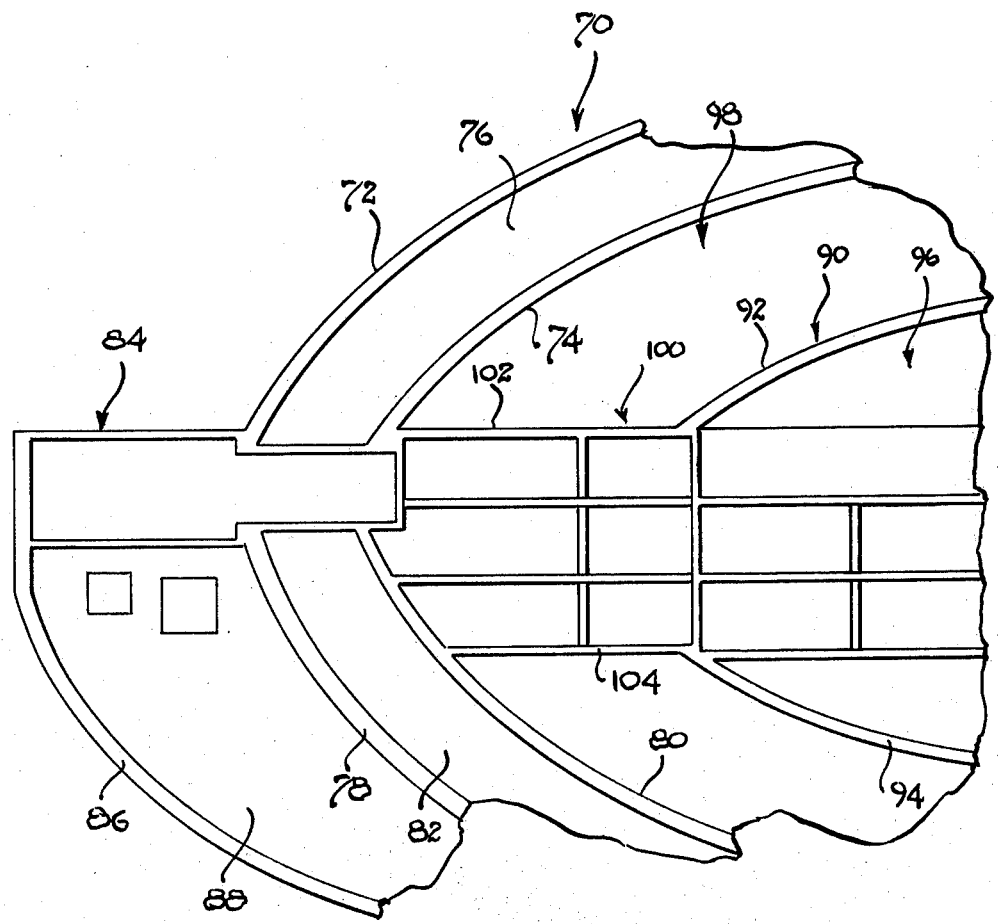

Having thus described the invention in general terms, reference will now be made to the accompanying drawings in which:

FIG. 1 is a schematic vertical sectional view, broken away, and showing a dome structure constructed in accordance with and embodying the present invention;

FIG. 2 is a fragmentary vertical sectional view showing a portion of the walls forming part of the first and second domes in the dome structure of the invention;

FIG. 3 is a fragmentary vertical sectional view, somewhat similar to FIG. 2, and showing a modified form of wall construction for use in the dome structure of the present invention; and FIG. 4 is a schematic vertical sectional view, broken away and showing the interior construction of one embodiment of the dome structure constructed in accordance with and embodying the present invention.

DETAILED DESCRIPTION OF PREFERRED EMBODIMENTS

Referring now in more detail and by reference characters to the drawings which illustrate practical embodiments of the present invention, A designates a dome structure comprised of a first or outer dome 10 and a second or inner dome 12. The outer dome 10 is constructed of a first upper dome section 14 and a first lower dome section 16. In like manner, the second dome 12 is comprised of a second upper dome section 18 and a second lower dome section 20. In this way, a large space 22 exists between the first and second dome structures 10 and 12, respectively. In like manner, a large space 24 is formed within the interior of the second dome 12.

Located within the interior space 24 of the second dome are a plurality of vertically spaced apart horizontally disposed dividers 26 (four as illustrated). However, it should be understood that any number of horizontally disposed dividers could be employed in order to subdivide the space 24 into a plurality of floors designated by reference numeral 28. Consequently, in this case, three individual floors are formed approximately mid-way within the interior space 24.

As illustrated in FIG. 1 of the drawings, it can be observed that a plurality of vertically located horizontally spaced apart dividers are employed which further subdivide the various floors into a plurality of individual discrete compartments designated by reference numeral 30. Thus, for example, in the arrangement as illustrated, fifteen individual compartments have been formed approximately midway between the upper and lower portions in the space 24. However, it should be understood, again, that any number of vertically disposed dividers could be employed. Moreover, it is not necessary to form the various compartments within a rectangular array in the manner as illustrated. Consequently, the compartments could be formed of various sizes and shapes.

The uppermost of the horizontally disposed dividers 26 often referred to as "partitions" serves as an upper floor with a large space located thereabove and which is somewhat eliptically shaped. In this case, the large space could serve as an auditorium or other large enclosure for similar purposes. Spaced beneath the lowermost of the dividers 26 is a horizontally disposed partition 32. The space between the partition 32 and the lowermost of the horizontal dividers 26 could be designed as another large individual compartment for a variety of purposes. For one particular purpose, this area could serve as an aquarium such that it is filled with water to contain fish or similar sea life forms.

Located beneath the partition 32 are a plurality of vertically disposed dividers which are designed to form a plurality of individual compartments, three as shown. These individual compartments 34 are designed to house operating equipment as for example, pumps, air conditioning equipment and the like. In essence, all of the operating equipment and machinery necessary for operation and maintenance of the environmental equipment within the dome structure is provided in these compartments.

In order to provide access to the interior of the dome structure, two entrance ways 36 are provided. These entrance ways 36 could merely constiture openings in the various upper dome sections, e.g., the dome sections 12 and 14, or otherwise they could constitute more elaborate entrance ways with doors and the like. Moreover, it should be understood that any number of entrance ways could be employed. In the embodiment of the invention as illustrated, the entrance ways provided access to the uppermost of the floors 26. However, it should, again, be understood that the entrance ways could be located to provide access to a desired level within the interior compartment 24.

In the embodiment of the invention as illustrated, a plurality of vertically or somewhat vertically disposed dividers 37 are also located within the space 22 (between the first lower dome section 16 and the second lower dome section 20). In this way, a plurality of individual compartments 38 are formed within this space. It should be understood that these compartments could be for any desired purpose. For example, they could also serve to house the various equipment for operation of the entire dome structure. Otherwise, they could serve as living quarters, quarters or commercial establishments or the like.

The space between the first upper shell 14 and the second upper shell 18 could also be subdivided into a plurality of individual compartments much in the same manner as the space 22 is so subdivided. However, in one embodiment of the invention, this space is not necessarily subdivided and is used for creating a desired environmental condition within remaining portions of the dome structure. In the embodiment as illustrated, this section is provided with filters for screening air in the event that the dome structure is to be used in an earth, natural air environment. For example, a plurality of individual air filters, heat controlling devices and the like may be located in this area. Furthermore, and for this purpose, a large ventilator is located on the upper portion of the first upper shell 14 and extends between the space between the first upper shell 14 and the second upper shell 18. In this way, the ventilator is designed to provide a clean air intake for the remaining portion of the dome structure. In addition, the ventilator could be provided with air conditioning equipment, heating equipment or the like. Again, this equipment could be controlled from any of the compartments, for example, the equipment compartments 34 as heretofore described.

The dome structure in the embodiment as illustrated may also be provided with portions which extend between the various dome sections as for example, peripherally extending annular portions 40 which serve to connect the various dome sections together. It should also be observed in connection with this aspect of the invention, that these annular sections 40 also have interior compartments 42 which may be further subdivided. Again, these compartments could serve any of a number of purposes.

In connection with the present invention, it should be understood that the various compartments as illustrated could serve a variety of purposes, depending upon the intended use of the dome structure. For example, these various compartments could serve as living quarters, commercial or industrial establishments or the like. Again, if the dome structure of the present invention is to be used in an underwater environment, many of the individual compartments would function as living quarters with other compartments functioning as commercial or industrial establishments.

For the purposes of underwater use, and for similar purposes, a third dome may be provided. In this case, the third dome may be a complete dome including an upper dome section and a lower dome section, or it may only merely be part of the upper or lower dome sections. In the embodiment as illustrated, a third lower dome section 44 is provided. In this case, the third lower dome section is connected to the other dome sections by means of a horizontally located platform 46 in the manner as illustrated in FIG. 1. In this case, the platform 46 serves as a ramp to the entrance ways 36.

The third lower dome section and the second lower dome section 16 form a space 48 therebetween and which could again be used for a variety of purposes. In the embodiment as illustrated, the space 48, which is somewhat semi-hemispherically shaped, may easily function as an amphitheatre. For this purpose, a stage 50 is located at the lower portion thereof. In addition, various tiers of seats could be installed on the upper surface of the third dome section 44. Moreover, mounted on the undersurface of the second dome section 16 would be a plurality of lights in order to illuminate the area as may be desired. For this purpose, elevators, walkways and the like could also be employed.

It should also be observed that the entire chamber 48, or at least a portion thereof, could function as a ballast chamber. For this purpose, the ballast chamber would be used in the event that the dome structure is adapted for submergible underwater environment. Thus, if it were desired to submerge the entire dome structure, the chamber 48 or at least portions thereof would have water introduced therein and for purposes of surfacing, the water would be pumped outwardly therefrom, much in the same manner as in a conventional submarine.

It should be observed that the walls of the various dome sections are relatively thick and in this case, could be provided with hollow chambers or the like. Moreover, the walls of the various dome sections are also designed so that they contain internal compartments to carry electric conduit, plumbing or the like, as may be required. In addition, the walls are provided with recessed portions in order to receive lamps for lighting, air conditioning duct work, etc. For example, the interior surface of the second upper dome section 18 is provided with a plurality of lamps such as the lamps 52. In addition, air outlets 54 which are capable of introducing heated air or conditioned air such as cool air are also provided. In this respect it should be understood that the air inlets could be located in many or all of the interior locations of the dome sections. For that matter, various air circulating outlets and the like will also be provided throughout the structure.

FIG. 2 is a fragmentary vertical sectional view showing one embodiment of dome sections which may be used in accordance with the present invention. Particularly, FIG. 2 illustrates a wall section of the first upper dome section 14 and the second upper dome section 18. The first upper dome section 14 in this embodiment is provided with a plurality of spaced apart solar cells 60 of the type which are capable of generating electrical power when solar radiation is incident thereupon. In addition, one or more of the solar cells 60 may be designed as a black body radiator which is designed to provide heat to a liquid medium as for example, water passing therethrough in order to provide a source of hot water or heat for various compartments in the dome structure.

The wall section of the dome section 18 is provided, in this embodiment, with a plurality of power storage cells 62. In each case, it should be observed that solar cells could be replaced by other devices and for that matter, the power cells 62 could similarly be replaced by other devices. For example, in the case of an outer space use, heat insulators and the like could be used in each of the skins forming part of the dome sections.

FIG. 3 is a fragmentary vertical sectional view, similar to FIG. 2, and showing another modified form of dome section wall structure. In this case, the wall forming part of the dome section is comprised of an outer skin 64 and an inner skin 66 which thereby form an interior compartment 68. The interior compartment could be filled with a heat conducting fluid so that heat which may be introduced through the outer skin could be absorbed by the fluid and carried to other areas within the dome structure for purposes of heating, etc. Moreover, the space between the skins 64 and 66 could be used as a heat insulative area or the like. It should be understood that a variety of other wall constructions could be employed in the various dome forming sections in accordance with the present invention.

FIG. 4 illustrates a modified form of dome section in accordance with the present invention. This modified form of dome structure is designated by reference numeral 70 and is comprised of a first upper dome section 72 and a second inwardly spaced upper dome section 74 which form a space 76 therebetween, much in the manner as the dome structures 10 and 12 form a space 18 therebetween. In addition, a first lower dome section 78 and a second lower dome section 80 form a space 82 therebetween. Each of these dome sections 72, 74, 78 and 80 are connected by a peripherally extending member 84 in the manner as previously described with the embodiment of the dome structure as illustrated in FIG. 1. Moreover, a third lower dome section 86 is connected to the peripherally extending section 84 and is spaced from the second first lower dome section 78 in order to provide a space 88 therebetween. Again, each of the aforesaid mentioned spaces could be subdivided in the manner as previously described into individual compartments.

In the embodiment of the invention as illustrated in FIG. 4, an additional interior dome forming member is also provided. In this case, an interior dome section or fourth dome 90, comprised of a fourth upper dome section 92 and a fourth lower dome section 94 form an interior chamber 96. Moreover, each of these dome sections 92 and 94 have a size smaller than the second dome section 74 and 80, respectively so as to form a space 98 therebetween.

The dome structure 90 is connected to the peripherally extending member 84 by another peripherally extending member 100. In this case, the peripherally extending member 100 is also provided with upper and lower walls 102 and 104. These upper walls 102 are connected to the second upper dome section 94 and the lower walls 104 are connected to the second lower dome section 80 as in the manner as illustrated in FIG. 4. Moreover, the walls 102 and 104 are subdivided by horizontal and vertical dividers into a plurality of interior compartments. The same holds true with respect to the space 96 in the fourth dome structure. Thus, it can be observed that a large number of dome shells could be used in accordance with the present invention to provide a wide variety of interior configurations. The above described embodiments are only illustrative of the various dome structures which could be constructed in accordance with the present invention. Moreover, these dome sections are only illustrative of the various uses which could be made with the dome structures of the present invention.

The dome sections in the illustrated apparatus are preferably hemispherical so that two abutting and mating dome sections will form a generally spherical construction.

The various dome sections including the partitions and peripherally extending members may be formed of many of a number of known structural materials including various metals such as steel, aluminum, or the like. In addition, other structural materials such as thick glass sheets, glass brick etc. may be used. Further, many of the components of the apparatus may be formed of plastic materials and preferably reinforced plastic materials such as fiberglass-epoxy composites, and the like.

Thus there has been illustrated and described a unique and novel dome structure having at least one environmentally isolated chamber and which therefore fulfills all of the objects and advantages sought therefore. It should be understood that many changes, modifications, variations and other uses and applications will become apparent to those skilled in the art after considering this specification and the accompanying drawings. Therefore, any and all such changes, modifications, variations and other uses in applications which become apparent to those skilled in the art after considering this specification and the accompanying drawings are deemed to be covered by the invention which is limited only by the following claims.

Having thus described my invention, what I desire to claim and secure by letters patent is:

1. A dome structure having a plurality of inhabitable and environmentally isolatable compartments, said dome structure comprising:
   (a) a first upper dome section;
   (b) a first lower dome section which forms a first environmentally isolated dome chamber therebetween;
   (c) a second upper dome section, having a peripheral size smaller than said first upper dome section;
   (d) a second lower dome section having a peripheral size smaller than said first lower dome section and which forms a second environmentally isolated dome chamber which is surrounded by and environmentally isolated from said first dome chamber,
   (e) a peripherally extending section extending between and engaging peripheral portions of said first and second upper dome section, said peripherally extending section also extending between and engaging peripheral portions of said first and second lower dome sections, to thereby connect said first upper and lower dome sections and said second upper and lower dome sections and also aid in the isolated formation of said first and second dome chambers, said peripherally extending section also being located approximately midway between the upper and lower ends of said first dome sections and between the upper and lower ends of said second dome sections and extending completely therearound, and
   (f) mean subdividing said second dome chamber into a plurality of inhabitable and environmentally isolated compartments having a size to be occupied by human beings and said first chamber having at least one compartment having a size to be occupied by human beings, said peripherally extending section also having a size so that it forms at least one compartment with a size to be occupied by human beings.

2. The dome structure of claim 1 further characterized in that a third lower dome section having the same shape as said but first lower dome section and a peripherally larger size surrounds said first lower dome section to form a third dome chamber thereon.

3. The dome structure of claim 2 further characterized in that said third lower dome section engages said peripherally extending section and also forms an environmentally isolated chamber with a size to be occupied by human beings.

4. The dome structure of claim 2 further characterized in that each of said upper dome sections have conical shapes with peripheral edges engaging said peripherally extending section and each of said lower dome sections having conical shapes with corresponding peripheral edges of the lower dome sections engaging the peripheral extending section.

5. The dome structure of claim 4 further characterized in that the peripheral edge portion of each said dome section is generally circularly shaped.

6. The dome structure of claim 1 further characterized in that said means subdividing said second dome chamber comprises at least one generally horizontally disposed divider to subdivide the second dome chamber into upper and lower second dome compartments.

7. The dome structure of claim 1 further characterized in that said means subdividing said second dome chamber comprises a plurality of horizontally spaced apart dividers to subdivide said second dome chamber into at least a plurality of upper and lower dome compartments.

8. The dome structure of claim 7 further characterized in that at least one generally vertically disposed divider extends between said first lower dome section and second lower dome section to form a plurality of generally horizontally located invididual compartments with a size sufficient to be occupied by human beings.

9. A dome structure having a plurality of inhabitable and environmentally isolatable compartments, said dome structure being comprised of:

(a) a first somewhat spherical dome, said dome being comprised of a somewhat semi-hemispherical first dome forming wall and a somewhat semi-hemispherical second dome forming wall having a major surface area spaced from the first dome forming wall but with peripheral edges of the first and second dome forming walls being in operative contact forming a first dome space therebetween, (b) a second somewhat spherical dome having a shape substantially the same as and a size substantially smaller than said first dome, to thereby form a chamber therebetween, said second dome being comprised of a somewhat semi-hemispherical first dome forming wall and a somewhat semi-hemispherical second dome forming wall having a major surface area spaced from the first dome forming wall of said second somewhat semi-hemispherical dome thereby forming a second dome space between the first and second dome forming walls of said second dome, (c) a plurality of horizontally spaced apart vertically disposed dividers extending within said chamber of said second dome, and (d) a plurality of vertically spaced apart horizontally disposed dividers extending within said chamber of said second dome forming a plurality of floors of environmentally isolated and spaced apart compartments with each being sized to accommodate a human being.

10. The dome structure of claim 9 further characterized in that said structure comprises a third somewhat spherical dome having substantially the same shape as said second dome and a peripherally smaller size then said second dome, said third dome being surrounded by said second dome to form a third dome chamber therebetween.

11. The dome structure of claim 10 further characterized in that said first, second and third domes have peripherally extending edge portions approximately midway between upper and lower portions thereof which engage each other.

12. The dome structure of claim 11 further characterized in that the peripheral edge portions of each of said first, second and third domes are generally circularly shaped.

13. The dome structure of claim 9 further characterized in that said structure comprises generally horizontally spaced apart vertically disposed dividers in said first dome space to subdivide the first dome space into a plurality of first dome compartments which are sized to accomodate human beings.

14. The dome structure of claim 9 further characterized in that said second dome comprises a plurality of horizontally spaced apart dividers which provide a plurality of floors and a plurality of vertically spaced apart dividers to further subdivide each floor into a plurality of compartments on each floor in said second dome.

15. The dome structure of claim 14 further characterized in that at least one vertically disposed divider extends between said first dome and second dome forming walls of said first dome to form a plurality of generally horizontally located individual compartments therein having a size to accommodate human beings.

16. A dome structure having a plurality of inhabitable and environmentally isolatable compartments, said dome structure comprising of:

(a) a first somewhat hemispherically shaped upper dome section;

(b) a first somewhat hemispherically shaped lower dome section which forms a first environmentally isolated dome chamber therebetween;

(c) a second somewhat hermispherically shaped upper dome section, having a peripheral size smaller than said first upper dome section;

(d) a second somewhat hemispherically shaped lower dome section having a peripheral size smaller than said first lower dome section and which forms a second environmentally isolated dome chamber which is surrounded by and environmentally isolated from said first dome chamber;

(e) a plurality of vertically spaced apart horizontally extending dividers subdividing said second dome chamber into a plurality of floors; and (f) a plurality of horizontally spaced apart vertically extending dividers subdividing said floors of said second dome chamber into a plurality of inhabitable and environmentally isolatable compartments having sizes to be occupied by human beings and said first chamber having at least one compartment having a size to be occupied by human beings;

(g) a peripherally extending section extending between and engaging peripheral portions of said first and second upper dome sections, said peripherally extending section also extending between and engaging peripheral portions of said first and second lower dome sections, to thereby connect said first upper and lower dome sections and said second upper and lower dome sections and also aids in the isolated formation of said first and second dome chambers, said peripherally extending section also being located approximately midway between the upper and lower ends of said first dome sections and between the upper and lower ends of said second dome sections and extending completely therearound;

(h) a plurality of dividers extending between the first and second lower dome sections to form a plurality of inhabitable and environmentally isolatable compartments in said first dome chamber and which chambers have a size to be occupied by human beings; and (i) ventilating means on one of said first dome sections to enable ventilating air to be circulated to said various compartments.

17. The dome structure of claim 16 further characterized in that a third lower dome section having the same shape as said first lower dome section and a peripherally larger size surrounds said first lower dome section to form a third chamber therebetween.

18. The dome structure of claim 17 further characterized in that said third lower dome section engages said peripherally extending section and also forms an environmentally isolated chamber with a size to be occupied by human beings.

* * * * *